June 7, 1960 G. A. OLSON 2,939,274
MEANS FOR VARYING A JET ENGINE ORIFICE
Filed Jan. 4, 1954
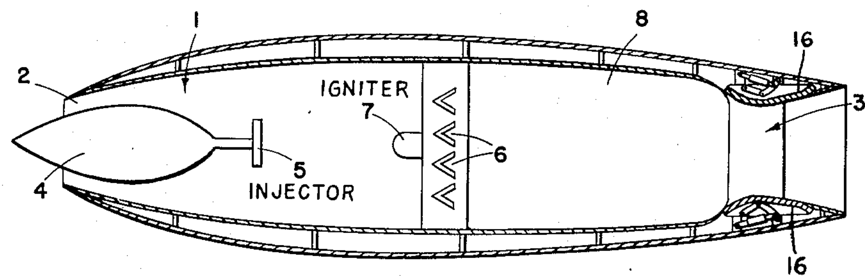
FIG. 1
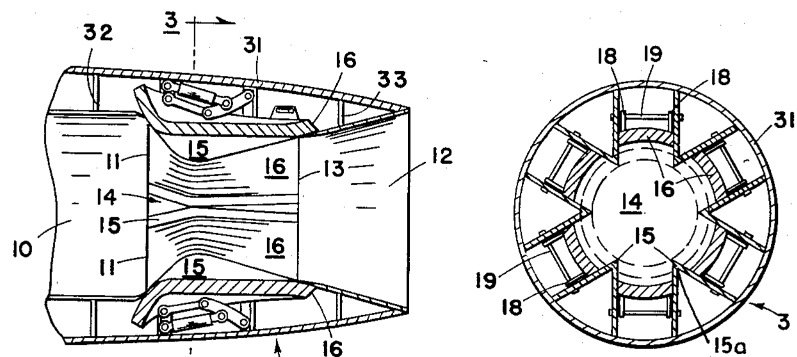
FIG. 2
FIG. 3
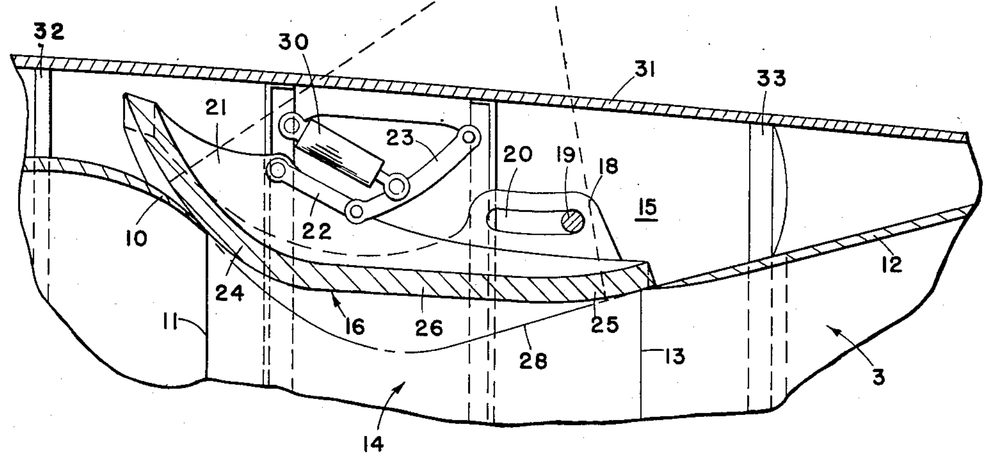
FIG. 4
INVENTOR.
GORDON A. OLSON
BY
William R[illegible]
ATTORNEY

United States Patent Office 2,939,274

Patented June 7, 1960

1

2,939,274

MEANS FOR VARYING A JET ENGINE ORIFICE

Gordon A. Olson, Anaheim, Calif., assignor to North American Aviation, Inc.

Filed Jan. 4, 1954, Ser. No. 402,039

4 Claims. (Cl. 60—35.6)

This invention relates to jet engines and more particularly to means for varying the area of a jet engine orifice.

Jet engines are conventionally provided with an intake orifice or diffuser and an exhaust nozzle having a restricted orifice commonly known as the throat. Unlike the reciprocating engine and turbojet engine, which can operate effectively over ranges of velocities and thrust outputs, the contemporary fixed-geometry ramjet engine can operate efficiently only at or near its specific design condition. When such a ramjet engine operates at an off-design Mach number, either the efficiency of the inlet diffuser is decreased or the desired heat addition is not possible.

An exhaust nozzle capable of varying throat areas makes possible a readjustment of the exhaust throat to diffuser inlet area ratio as required by changes in flight Mach number and in heat addition. In other words, a variable area throat for the exhaust nozzle of a jet engine makes possible the variation of mass flow and/or combustion temperature, thereby producing efficient thrust changes. Likewise, the ability to vary the inlet orifice area produces a more flexible control of the air-flow so that it may be adjusted to variable flight conditions.

Since a small variance in the size of an inlet or exhaust nozzle from design values may make a great difference in flight characteristics, it is also important that any jet engine have variable geometry so that the ground adjustments may be made to yield the optimum flight characteristics. Up to this time, designers have been forced to be satisfied with fixed geometry engines because of the mechanical difficulties inherent in any three dimensional variable system operating at the high temperatures and pressures encountered in the jet engine-powered flight of today.

A jet engine having these orifices variable, then, claims the advantages of increased thrust range, increased upper altitude limit of operation, and more efficient variable Mach number flight.

It is therefore an object of this invention to provide means for varying the cross-sectional area of a jet engine orifice.

Another object of this invention is the provision of a device for varying the throat area of an exhaust nozzle of a jet engine.

Still another object of this invention is the provision of means characterized by mechanical and operational simplicity and having the ability to operate satisfactorily at high temperatures and pressures for varying the cross-sectional area of the orifices of a jet engine.

A further object of this invention is the provision of a variable area fluid passageway.

Other objects and advantages will become apparent from the following description taken in connection with the accompanying drawings, in which Fig. 1 is a semi-schematic longitudinal sectional view of a jet engine;

Fig. 2 is a semi-schematic longitudinal sectional view of an exhaust nozzle constructed in accordance with this invention;

Fig. 3 is a cross-sectional view taken along line 3—3 of Fig. 2;

And Fig. 4 is an enlarged longitudinal sectional view of a portion of the exhaust nozzle of Fig. 2 showing details thereof.

In detail Fig. 1 shows a ramjet engine comprising a tubular housing or duct 1, having an intake orifice 2 and an exhaust nozzle 3, adapted for gas flow therethrough from orifice 2 through nozzle 3. Mounted internally of duct 1 and partially extending outwardly of intake orifice 2 is shown conically-shaped island 4, having a rearwardly directed fuel injector 5 extending from its aft end. Although the engine is shown with a fixed area intake orifice, it will be noted that the means to be described for varying the exhaust nozzle throat area can as well be mounted for varying this intake orifice (or a throat near this orifice) in order to accomplish the desirable results previously described.

Secured to duct 1 aft of injector 5 are shown conventional flame stabilizer 6 and igniter 7. The portion of duct 1 between flame stabilizer 6 and nozzle 3 is known as combustion chamber 8 and therein the majority of the burning of the fuel and air mixture takes place.

Figs. 2, 3 show schematically the construction of nozzle 3 in which converging nozzle shell 10 extends rearwardly from combustion chamber 8 and terminates at edge 11. The after-portion or diverging nozzle shell 12 extends from edge 13, spaced from edge 11, rearwardly to the end of nozzle 3. Forming the boundary of the restricted orifice or throat section 14 of nozzle 3 are circumferentially arranged V-shaped guides 15 between which are mounted longitudinally convex members or shoes 16. Shoes 16 are transversely concave (Fig. 3) so as to form, in conjunction with guides 15, the substantially circular cross-section of throat 14. Guides 15 are fixed at either end to edges 11 and 13, respectively, of nozzle shells 10, 12 whereas shoes 16 are in slidable contact with and overlay said edges.

Each shoe 16 is mounted for rotation about an axis 17 so as to be continuously in contact with edges 11 and 13. Such mounting (seen in Fig. 4) may be accomplished by slidably securing flange 18 (on the backside of each shoe 16) to an adjacent guide 15 as by pin 19 and slot 20 in flange 18, and by pin connecting web 21 (on the rear side of shoe 16) to guide 15 by pin connected links 22, 23. Hence, by shaping the end portions 24, 25 of shoes 16 in arcs of unequal radii from axis 17, as long as shoe 16 is constrained by the previously described linkages to rotate about axis 17, the ends of said shoe will be continuously in contact with edges 11, 13.

The central portion 26 of shoe 16 between end portions 24, 25 is longitudinally curved to have a variable slope change at its surface so that as shoe 16 is rotated from the solid line position, shown in Figs. 3, 4 to the dot-dash line position 28, the distance between surfaces of opposed shoes 16 is changed and the cross-sectional area of throat 14 is thereby decreased. Hydraulic piston actuators 30 may be provided for each shoe 16 and pivotally connected to each link 23 to cause the above-described rotation. In this manner the desirable effects resultant from changing the exhaust nozzle throat area may be obtained.

The re-entrant wedge sections at **15*a* between guides 15** may be cooled by internal flow of air or fuel to prevent overheating.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A three-dimensional variable area throat exhaust nozzle for a jet engine comprising a circular cross-section converging shell, a circular cross-section diverging shell axially spaced from said converging shell, and variable area throat means joining the small-diameter ends of each of said shells including a plurality of members, a plurality of guides extending longitudinally between said shells, said members and said guides being arranged circumferentially and alternately adjacent to form a continuous, converging-diverging nozzle throat between said shells, said members being in slidable engagement with said small-diameter ends externally thereof, said members being longitudinally convex, each of said members being slidably mounted at a first portion to said guides, means connected to said members for moving each member both rotatively and longitudinally of said guides whereby each member is mounted for longitudinal and rotative movement about an axis which is outside said shells.

2. A variable area throat exhaust nozzle for a jet engine comprising a circular cross-section converging shell, a circular cross-section diverging shell aligned with and spaced from said converging shell, and variable area throat means joining the small-diameter ends of each of said shells including longitudinally convex, transversely concave members arranged circumferentially of the longitudinal axis of said shells, whose end portions are in slidable engagement with said small-diameter ends externally thereof, and whose central portions between said ends are formed with variable longitudinal slope change, each member being mounted for rotation about a rotation axis which is outside said shells, normal to and not intersecting the longitudinal axis of said shells and nonequidistant from the points at which each member's end portions engage said shells, V-shaped guides disposed between each pair of said members so as to form longitudinal parallel-sided channels for retaining said members, and means for rotating each said member within said channel about said rotation axis whereby the rotation of said members causes said central portions to describe a throat of a variable cross-section.

3. A variable area throat nozzle for a jet engine comprising a circular cross-section converging shell, a circular cross-section diverging shell aligned with and spaced from said converging shell, and variable area throat means joining said shells including a plurality of shoes transversely concave about the longitudinal axis of said shells, a plurality of V-shaped guides, said shoes and said guides being longitudinally convex and alternately arranged adjacent each other to form a continuous, symmetrical, converging-diverging nozzle throat about said longitudinal axis, each of said guides being secured at opposite ends to one of said shells and each of said shoes having opposite ends slidably engaging said shells externally thereof, and said shoes each having flanges pin-and-slot connected to said guides, and means adapted to rotate each of said shoes about an axis which is outside said shells and other than the axis of convexity of said shoes whereby said shoes are caused to vary the cross-sectional area of said nozzle throat.

4. In combination with a three-dimensional variable area throat for a jet engine exhaust nozzle having a rearwardly converging shell and rearwardly diverging shell spaced axially downstream from said first mentioned shell; a plurality of longitudinal venturi-segment members located between said shells and in sliding contact with the outer side of the opposed edges of said shells; a plurality of guides; said members and guides being arranged circumferentially and alternately adjacent each other to form a continuous venturi section; said members being longitudinally convex, each of said members being slidably mounted to said guides at a first point by a member normal to the longitudinal axis of the nozzle; link means connected to each of said venturi-segment members at a second point which when moved, cause said venturi members to move rotatively and from a forward to rearward position relative to said shells whereby a portion of each of the venturi members which are exposed to the interior of the nozzle when said members are in the forward position is moved outside the second mentioned shell when said members are moved to the rearward position; and means to move said link means.

References Cited in the file of this patent

UNITED STATES PATENTS

| | | |
|---|---|---|
| 1,001,290 | McKee | Aug. 22, 1911 |
| 1,839,672 | Hamon | Jan. 5, 1932 |
| 2,401,496 | Mercier | June 4, 1946 |
| 2,488,174 | Clegern | Nov. 15, 1949 |
| 2,597,253 | Melchior | May 20, 1952 |
| 2,625,008 | Crook | Jan. 13, 1953 |
| 2,651,172 | Kennedy | Sept. 8, 1953 |
| 2,770,944 | Jordan | Nov. 20, 1956 |
| 2,778,190 | Bush | Jan. 22, 1957 |
| 2,858,668 | Kelley et al. | Nov. 4, 1958 |

FOREIGN PATENTS

| | | |
|---|---|---|
| 580,995 | Great Britain | Sept. 26, 1946 |